(12) United States Patent
Schultz et al.

(10) Patent No.: US 8,565,527 B2
(45) Date of Patent: Oct. 22, 2013

(54) FILM MARKING DETECTION SYSTEM

(75) Inventors: Mark Alan Schultz, Carmel, IN (US); Ryoichi Osawa, Indianapolis, IN (US); Robert Warren Schmidt, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1234 days.

(21) Appl. No.: 11/883,146

(22) PCT Filed: Jan. 27, 2005

(86) PCT No.: PCT/US2005/002921
§ 371 (c)(1),
(2), (4) Date: Jul. 26, 2007

(87) PCT Pub. No.: WO2006/080922
PCT Pub. Date: Aug. 3, 2006

(65) Prior Publication Data
US 2008/0089555 A1    Apr. 17, 2008

(51) Int. Cl.
*G06K 9/00*    (2006.01)
(52) U.S. Cl.
USPC .......................................... 382/181; 382/100
(58) Field of Classification Search
USPC .......................... 382/181, 100, 202, 250, 141
See application file for complete search history.

(56) References Cited

U.S. PATENT DOCUMENTS

| | | | |
|---|---|---|---|
| 4,743,948 A | 5/1988 | Ohtsuka | |
| 5,107,127 A | 4/1992 | Stevens | |
| 5,477,289 A | 12/1995 | Smart | |
| 5,850,481 A | 12/1998 | Rhoads | |
| 6,388,704 B1 | 5/2002 | Wischermann | |
| 6,556,273 B1 | 4/2003 | Wheeler et al. | |
| 6,628,801 B2 | 9/2003 | Powell et al. | |
| 2001/0026616 A1* | 10/2001 | Tanaka | 380/202 |
| 2002/0081018 A1 | 6/2002 | Hamano et al. | |
| 2003/0011748 A1 | 1/2003 | Varian | |

(Continued)

FOREIGN PATENT DOCUMENTS

| | | |
|---|---|---|
| EP | 0046254 | 2/1982 |
| EP | 1016899 | 5/2000 |

(Continued)

OTHER PUBLICATIONS

Anonymous, "Mid-roll interrupt with multiple burst magnetic data", Research Disclosure Journal, Oct. 1994 (Research Disclosure Database No. 366041), pp. 1.

(Continued)

*Primary Examiner* — Ruiping Li
(74) *Attorney, Agent, or Firm* — Robert D. Shedd; Robert B. Levy

(57) ABSTRACT

A method and a system accomplish inspection of a mark in a frame of a film print. The system can include a frame imager which automatically selects at least one frame in the film print having an FMS mark and automatically captures an image of the frame. The image can be captured prior to, or subsequent to, the print being developed. The system also can include a marker which marks the frame with the mark. Further, the system can include a processor which automatically extracts the mark from the captured image and automatically compares the mark on the frame to a reference mark. The captured image can be stored to a database.

10 Claims, 4 Drawing Sheets

(56) References Cited

U.S. PATENT DOCUMENTS

| | | |
|---|---|---|
| 2003/0026450 A1 | 2/2003 | Powell et al. |
| 2003/0138127 A1 | 7/2003 | Miller et al. |
| 2004/0111936 A1 | 6/2004 | Jones |
| 2004/0156111 A1 | 8/2004 | Roddy et al. |
| 2004/0263911 A1 | 12/2004 | Rodriguez et al. |
| 2005/0086480 A1* | 4/2005 | Kerr et al. .................... 713/176 |
| 2006/0062073 A1 | 3/2006 | Kitani et al. |

FOREIGN PATENT DOCUMENTS

| | | |
|---|---|---|
| GB | 2286276 | 9/1995 |
| JP | 59135455 | 1/1983 |
| JP | 59135472 | 9/1983 |
| JP | 05062269 | 3/1993 |
| JP | 5127247 | 5/1993 |
| JP | 07038705 | 2/1995 |
| JP | 9-509795 | 9/1997 |
| JP | 2000181085 | 6/2000 |
| JP | 2001197341 | 7/2001 |
| JP | 2002-171494 | 6/2002 |
| JP | 2004248276 | 9/2004 |
| JP | 2004288280 | 10/2004 |
| JP | 2004-343722 | 12/2004 |
| WO | WO95/14289 | 5/1995 |
| WO | WO2004/030339 | 4/2004 |
| WO | 2004063985 | 7/2004 |
| WO | WO2005114569 | 12/2005 |

OTHER PUBLICATIONS

Anonymous A technique for the detection and removal of local defects indigital images, Research Disclosure Journal, Jun. 1996 (Research Disclosure Database No. 386039), pp. 1-8.

Kirovski, Darko, et al., "Digital Rights Management for Digital Cinema", Applications of Digital Image Processing XXIV, Proceedings of SPIE, vol. 4472, 2001, pp. 105-120.

PCT Search Report.

* cited by examiner

FILM MARKING DETECTION SYSTEM

This application claims the benefit, under 35 U.S.C. §365 of International Application PCT/US2005/002921 filed Jan. 27, 2005, which was published in accordance with PCT Article 21(2) on Aug. 3, 2006 in English.

FIELD OF THE INVENTION

The inventive arrangements relate generally to the field of protecting film against illegal copying, and in particular, to a method for identifying anti-piracy film markings.

BACKGROUND OF THE INVENTION

Copyright infringement resulting from the piracy of motion picture films is a widespread problem. Once a film distributor distributes prints of a motion picture film to exhibitors for theatrical exhibition, a certain degree of control over the product is lost. In the regular course of exhibiting the film, a customer in the theater may surreptitiously record the film using, e.g., a hand held camcorder. At a more sophisticated level, a person seeking to obtain an illegal copy of a film print may gain access to a theater projection booth in collusion with an employee of the exhibitor and make a copy of the film after hours in a relatively controlled environment. In such an environment, the audio from the projection equipment can be directly fed to the camcorder. A tripod can be used to ensure a clear and steady picture. As a result, an illicit copy can be made.

To combat such piracy, processes have been developed to help identify such illegal film copies. This technology can be referred to as a film marking system (FMS). The FMS typically provides a series of faint dots in the picture that are added as the film print is manufactured. An example of a film print 400 having FMS markings 410 in frames 420 is depicted in FIG. 4.

Quality assurance processes are sometimes implemented to verify that film prints are properly marked with FMS marking. Such processes typically are performed manually, and involve loading a film print into a film viewing apparatus, looking up the specific frames that are marked, verifying the marks, and unloading the film. This process is very labor intensive, and therefore costly. Thus, only a small percentage of films undergo this FMS mark verification process. Moreover, the use of a manual inspection process introduces greater risk for human error. Accordingly, a system which automates FMS mark verification is needed to improve the accuracy of FMS mark verification and reduce the cost of such verification so that the process can be economically applied to all FMS marked film prints.

SUMMARY OF THE INVENTION

The present invention relates to a method and a system for inspecting a film for marks in the frames. The system can include a frame imager which automatically selects at least one frame in the film print having a mark and automatically captures an image of the frame. The image can be captured prior to, or subsequent to, the print being developed. Further, the system can include a processor which automatically extracts the mark from the captured image and automatically compares the mark of the frame to a reference mark. The captured image can be stored to a database.

In one arrangement, a first codec can digitally compress the captured image, for example with a compression scheme such as the moving picture experts group (MPEG) compression technique or other block-based scheme. The first codec or a second codec can uncompress the captured image. The processor can extract the mark from the uncompressed captured image.

BRIEF DESCRIPTION OF THE DRAWINGS

Preferred embodiments of the present invention will be described below in more detail, with reference to the accompanying drawings, in which.

DETAILED DESCRIPTION

An embodiment in accordance with the present invention relates to a method and an apparatus for automatically inspecting marks contained in image frames of motion picture film prints. The method and apparatus can be implemented in a film print quality assurance process to detect film frames which are not properly marked. In comparison to current methods of manually inspecting film prints, the present invention can provide greater mark inspection accuracy and can be implemented at a substantial cost savings.

Figure 1:
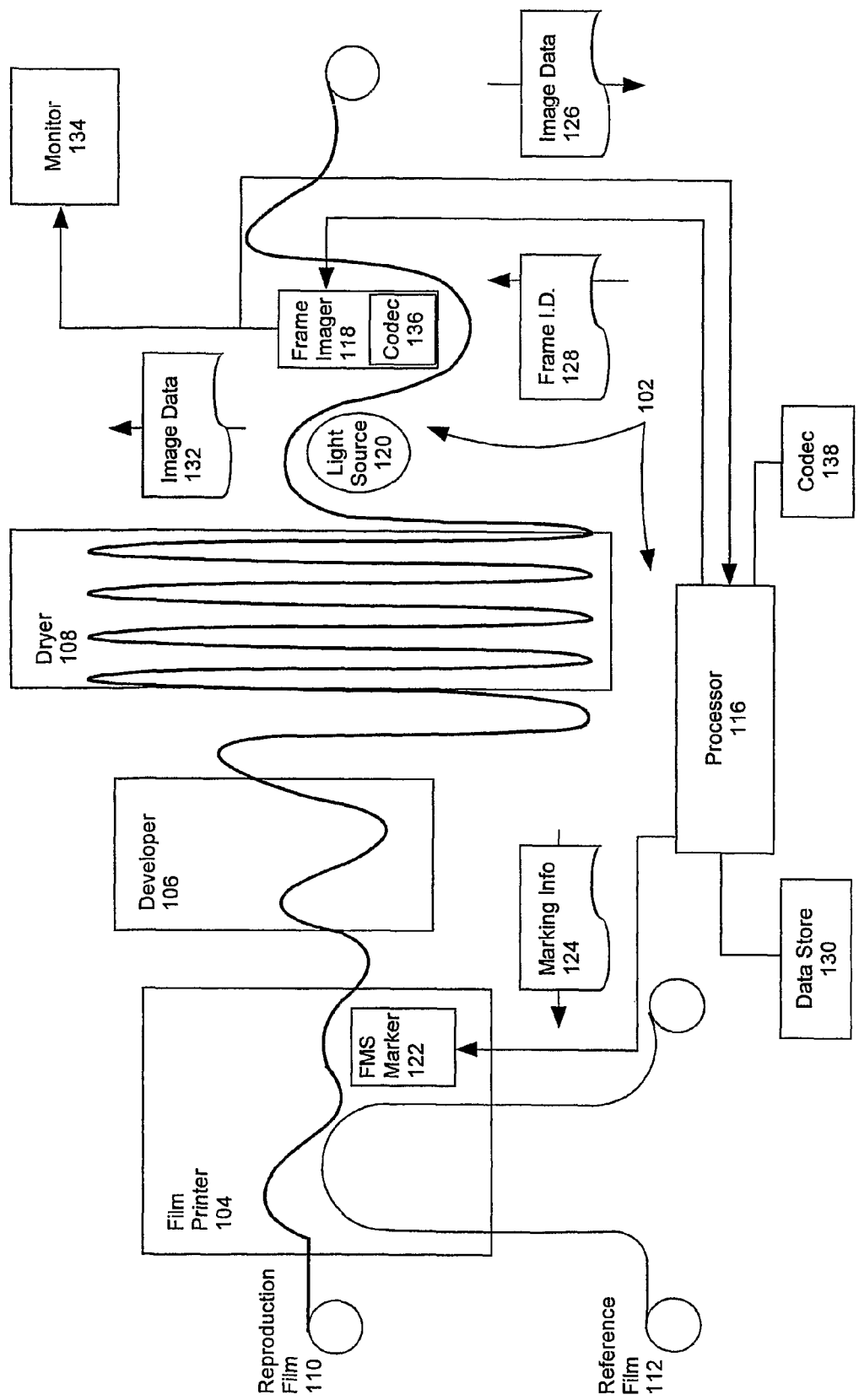
FIG. 1 is a diagram of a film print processing system which includes a film marking system (FMS) mark inspection system that is useful for understanding the invention.

Referring to FIG. 1, a diagram of a film print processing system 100, which includes an FMS mark inspection system 102 is depicted. In addition to the FMS mark inspection system 102, the film processing system 100 can comprise a film printer 104, a developer 106 and a dryer 108. Film printers, developers and dryers, and their operation, are well known to those skilled in the art of film print processing. Importantly, the present invention is not limited to any specific ones of such components. For example, the film printer can be a continuous contact printer, a step contact printer, a step optical printer, a continuous optical printer, a wet gate printer, or any other device, which can be used to generate motion picture images on a reproduction film 110 (hereinafter "film") using a reference film 112. Similarly, the developer 106 can comprise any apparatus used to develop the film 110, and the dryer 108 can comprise any apparatus can be used to dry the film 110 after the developing process.

The FMS mark processing system 102 can include a processor 116 and a frame imager 118 operatively connected to the processor 116. For instance, the processor 116 can comprise a central processing unit (CPU), an application specific integrated circuit (ASIC), a digital signal-processing unit (DSP), or any other processor suitable for processing images received from the frame imager 118. Further, the frame imager 118 can include an image sensor, for example, a charge coupled device (CCD) or complementary metal oxide semiconductors (CMOS), or any other imaging device suitable for receiving images from the film 110 and forwarding data correlating to the received images to the processor 116. A light source 120 can be provided to project images from the film 110 to the frame imager 118.

The print processing system 100 also can include an FMS marker 122 which marks frames of the film 110 with FMS marks. The FMS marker 122 can be operatively connected to the processor 116. The FMS marker 122 can include a strobe light, a laser, light emitting diodes (LCDs), a liquid crystal imager, or any other device suitable for generating photons to mark the film 110 with FMS marks. FMS markers are known to the skilled artisan.

In one arrangement, the processor 116 can provide FMS marking information 124 to the FMS marker 122, which can use the marking information 124 to mark the film 110 with the appropriate FMS marks in the appropriate frames. For example, the processor 116 can provide FMS marks to be used on the film print and frame identifiers that identify which frames of the film 110 are to be marked with the FMS marks. Such information can be retrieved from a data store 130 and/or a data input device (not shown). The data store 130 can comprise an electronic storage medium, a magnetic storage medium, an optical storage medium, a magneto-optical storage medium, or any other storage medium suitable for storing marking information 124. The marking information 124 can be stored on the data store 130 in data tables, arrays, text files, image files, or in any other suitable manner.

In operation, the FMS marker 122 can mark the film 110, in the designated frames, with the FMS marks. The FMS marker 122 can select the designated frames in any suitable manner. For example, the FMS marker 122 can include a counter (not shown) which counts the frames as the film 110 passes the FMS marker 122. In another arrangement, the FMS marker 122 can measure a length of film which has passed by the FMS marker 122. Still, any of a myriad of techniques can be used to identify the frames to be marked and the invention is not limited in this regard.

The frame imager 118 can capture images from frames of the film 110 and forward the image data 126 to the processor 116. The processor 116 can process the image data 126 to determine whether frames having FMS marks have been properly marked. For example, the processor 116 can provide frame identification information 128 to the frame imager 118, which identifies which frames of the film 110 contain FMS marks. Such frame identification information 128 also can be retrieved from the data store 130. Again, the frame identification information 128 can be stored on the data store 130 in data tables, arrays, text files, image files, or in any other suitable manner. In another arrangement, standardized frame sequences can be established for FMS marking and the frame imager 118 can be configured to automatically capture the images from frames identified by the frame sequences.

The frame imager 118 can selectively capture images from the film 110 and selectively forward correlating image data to the processor 116. In one arrangement, the frame imager 118 can capture images only from frames identified as being marked with FMS marks. Optionally, the frame imager 118 also can forward image data 132 to a monitor 134 for display. The image data 132 can be formatted in a video format compatible with the monitor 134, for example as a VGA signal. The image data 132 can contain captured images from the entire film or, alternatively, only the images marked with the FMS marks. For instance, a user selection can be received which chooses the type of image data 132 that is to be displayed on the monitor 134.

In one embodiment, the frame imager 118 can be positioned in the film processing system 100 so that the frame imager captures images of frames that have been developed. Accordingly, the image captured by the frame imager will represent the actual image that will be found on a screen when the film is displayed. Moreover, this arrangement facilitates the incorporation of the present invention with existing quality assurance equipment which already includes components for capturing images from individual frames.

As with the FMS marker 122, the frame imager 118 also can include a counter which counts the frames as the film 110 passes the frame imager 118, can measure a length of film which has passed by the frame imager 118, or identify the FMS mark marked frames in any suitable manner. For instance, the frame imager can analyze each frame to identify which frames have FMS marks and image the identified frames.

The processor 116 receives the image data 126 from the frame imager 118 and extracts the FMS marking contained in the image data 126. For example, the processor 116 can parse the image data 126 and identify markings contained in the image data 126. The processor 116 can compare the image data 126 to the FMS marking information 124 sent to the FMS marker 122 which correlates to the identified frame.

In another arrangement, the processor 116 can add appropriate FMS markings to an original frame to produce an expected data frame reference. The image data 126 then can be compared to the expected data frame reference by subtracting pixel values for each pixel of the expected data frame reference from the correlating pixels of the image data 126, or vice versa. Ideally, the difference will be almost zero for each pixel. If a mark is missing or is in an incorrect place, groups of pixels will have non-zero differences. The non-zero differences identified for pixel groups can be compared against threshold values to account for noise or framing displacements. To minimize the amount of image data, which is processed, the frames can be cropped to limit comparison of the pixels only to portions of the frame where FMS marking is expected. The FMS marks on the film may vary in size, color, and shape depending on the printing speed, type of film material, laser setup, and exposure time. Accordingly, some performance criteria may be needed to check for conformance to a particular specification.

If the image data 126 does not contain FMS marks that are a suitable representation of the FMS marks contained in the FMS marking information 124, an error condition can be triggered. For instance, error condition can generate an identifier that identifies a particular frame of the film 110 which is not properly marked.

The processor 116 can store the received image data 126 to the data store 130, for example a database. Accordingly, the received image data 126 can be later retrieved and inspected. The image data 126 can be formatted in any suitable image data format. For example, the image data 126 can be formatted as a Joint Photographic Experts Group (JPEG) file, a Graphics Interchange Format (GIF) file, a Tag Image File Format (TIFF) file, a Portable Network Graphics (PNG) file or a bitmap (BMP) file.

In one arrangement, the frame imager 118 can comprise a codec 136 which encodes the image data 126 as a Moving Picture Experts Group (MPEG) intraframe (I-frame), predictive frame (P-frame) and/or bidirectional frame (B-frame). In such an arrangement, multiple frames of the film 110 can be imaged so that together with the marked frame they form an MPEG group of pictures (GOP). Further, the processor 116 can include, or be operatively connected to, a codec 138 that decodes the GOP to retrieve the image data 126. Alternatively, the codec 136 can be used to decode the GOP. Other types of codecs could be employed for carrying out different types of compression schemes.

Regardless of whether one or multiple codecs are implemented, the arrangement of compressing and uncompressing the captured images is advantageous because it inherently verifies whether a particular image still contains appropriate FMS marking after being encoded and decoded. For example, if the marks are too small and/or do not appear in the correct frames after the coding and decoding process, this could be an indication that larger FMS marks are required to ensure that the FMS marking will not be lost if the film 110 is copied and compressed into an MPEG video stream, the typical way in which films currently are being pirated. Still, it is anticipated that other compression schemes can be used and the invention is not limited to MPEG compression.

Figure 2:
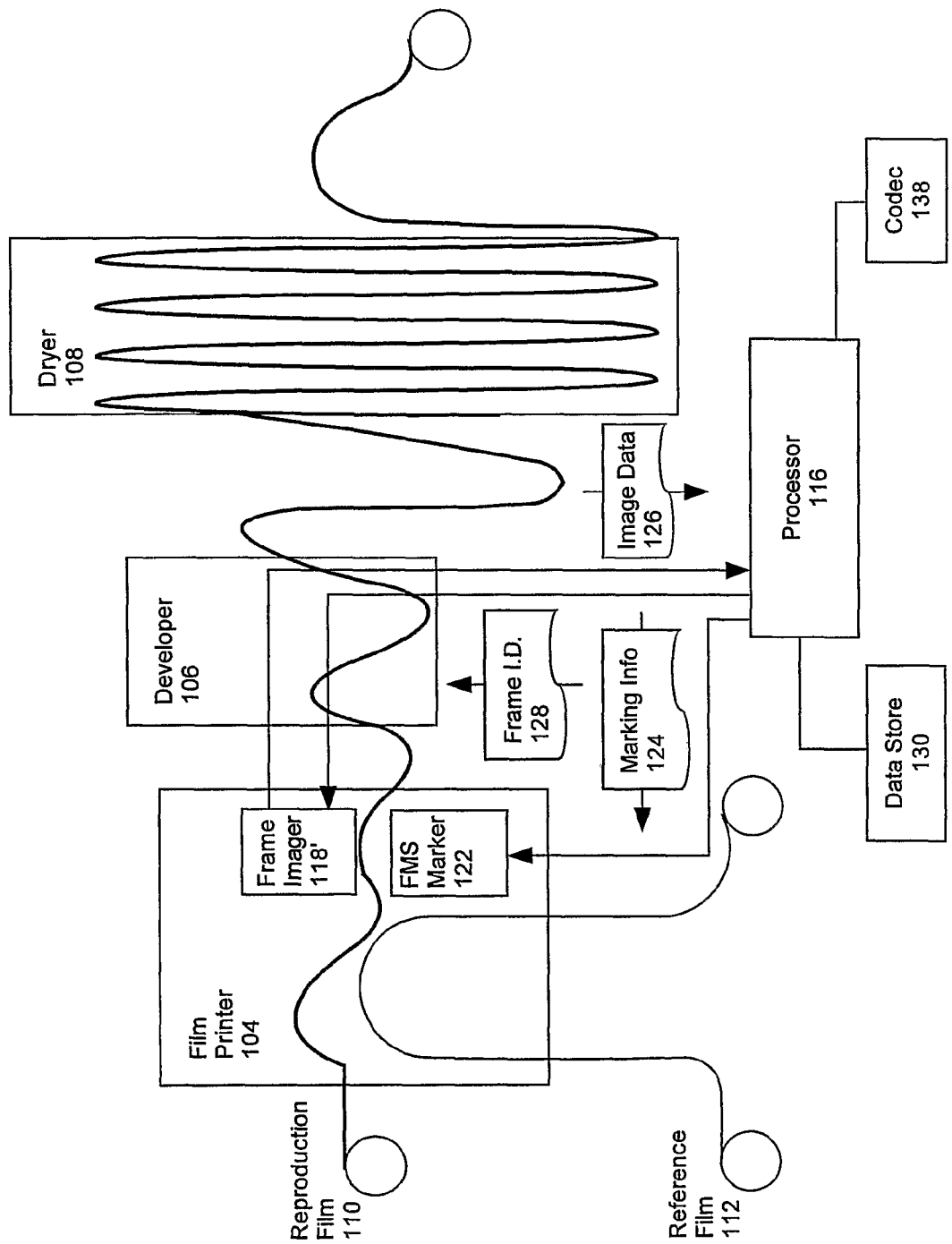
FIG. 2 is a diagram of a film print processing system which includes an alternate embodiment of the FMS mark inspection system of FIG. 1.

In an alternate embodiment, as shown in FIG. 2, the frame imager 118' can be positioned in the film printer 104. For example, the frame imager 118' can be positioned on an opposing side of the film 110 with respect to the FMS marker 122. In this arrangement, actual marking of the film 110 with FMS marks can trigger the frame imager 118' to capture an image of the frame being marked. A separate control process would not be required to identify frames that are marked with FMS marks. Moreover, the frame imager 118' could be used to record the actual energy of the marking system and feed this recording back to a control system of the FMS marker 122 to insure that the FMS marker 122 is operating properly.

Figure 3:
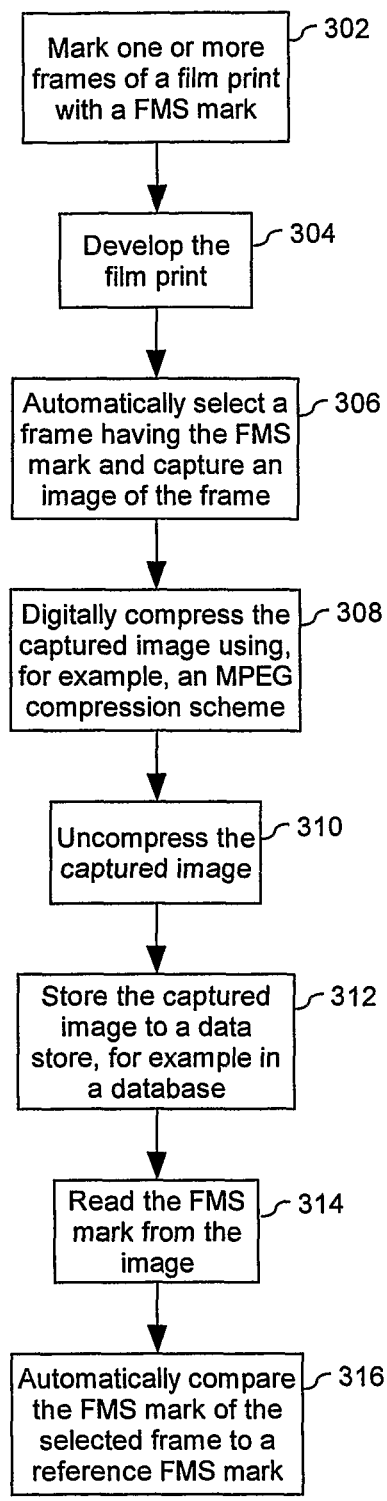
FIG. 3 is a flow chart which is useful for understanding the invention.
Figure 4:
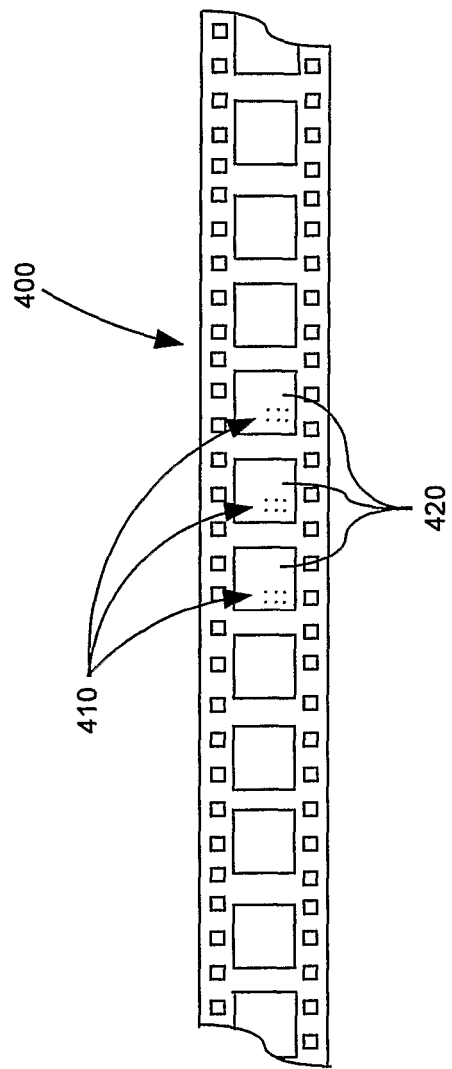
FIG. 4 is a diagram of a film print having FMS markings.

Referring to FIG. 3, a flow chart which is useful for understanding a method 300 for inspecting an FMS marking of a film print. Beginning at step 302, one or more frames of a film print can be marked with an FMS mark. Proceeding to step 304, the film print can be developed. At step 306, an image of a frame having the FMS mark can be automatically captured. As shown, step 306 occurs after step 304, but the invention is not limited in this regard. In particular, step 306 can occur before the film is developed in step 304.

Continuing at step 308, the captured image can be compressed, for example using an MPEG compression scheme. At step 310, the captured image can be uncompressed. Notably, steps 308 and 310 are not required to practice the present method 300, but are useful for insuring that the FMS marking will not be lost if the film 110 is copied and compressed into a video stream. Proceeding to step 312, the captured image can be stored to a data store, for example in a database. At step 314 the FMS mark can be extracted from the image and automatically compared to a reference FMS mark, as shown in step 316. In one arrangement, step 312 of storing the captured image can occur after steps 314 and 316.

While the foregoing is directed to the preferred embodiment of the present invention, other and further embodiments of the invention may be devised without departing from the basic scope thereof, and the scope thereof is determined by the claims that follow.

The invention claimed is:

1. A method for inspecting markings within a film print, comprising:
   automatically selecting at least one frame in said film print having a mark;
   automatically comparing said mark in said at least one frame to a reference mark, wherein said automatically comparing comprises:
   capturing an image of said at least one frame, said capturing being performed prior to said film print being developed, said capturing of said image is triggered by an actual marking of said at least one frame, and
   reading said mark from said captured image; and
   recording energy used for marking said at least one frame and using the recorded energy for feedback control.

2. The method according to claim 1, further comprising storing said captured image to a database.

3. The method according to claim 1, further comprising:
   digitally compressing said captured image; and
   uncompressing said captured image.

4. The method according to claim 3, wherein said digitally compressing step comprises compressing said captured image in accordance with a moving picture experts group (MPEG) compression scheme.

5. The method according to claim 1, further comprising:
   marking said at least one frame with said mark prior to said automatically selecting step.

6. A system for inspecting markings within a film print, comprising:
   a frame imager which automatically selects at least one frame in said film print having a mark, said frame imager automatically capturing an image of said at least one frame prior to said film print being developed;
   a processor which automatically compares said mark in said at least one frame to a reference mark, said processor automatically reading said mark from said captured image; and
   wherein said frame imager is configured for capturing said image by being triggered by actual marking of said at least one frame and for recording energy used in marking said at least one frame for feedback control.

7. The system according to claim 6, further comprising storing said captured image to a database.

8. The system according to claim 6, further comprising:
   a first codec which digitally compresses said captured image;
   at least one of said first codec and a second codec which uncompresses said captured image;
   wherein said processor extracts said mark from said uncompressed captured image.

9. The system according to claim 8, wherein said captured image is compressed in accordance with a moving picture experts group (MPEG) compression scheme.

10. The system according to claim 6, further comprising a marker which marks said at least one frame with said mark.

* * * * *